J. M. Stiren,
Steam-Engine Attachment,
No. 36,127. Patented Aug. 5, 1862.
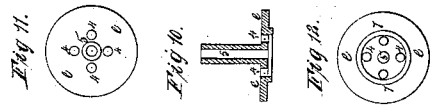
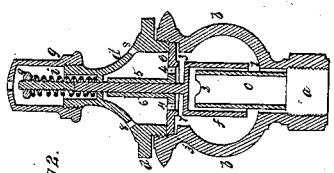
Witnesses.
Lemuel W. Serrell
Thos. Geo. Harold
Inventor
James M. Stiren

UNITED STATES PATENT OFFICE.

JAMES M. STIVEN, OF NEW YORK, N. Y., ASSIGNOR TO HIMSELF, MICHAEL TUOMEY, AND JOHN ELDER, JR., OF SAME PLACE.

IMPROVEMENT IN AIR-VALVES FOR STEAM APPARATUS.

Specification forming part of Letters Patent No. 36,127, dated August 5, 1862.

*To all whom it may concern:*

Be it known that I, JAMES M. STIVEN, of the city and State of New York, have invented, made, and applied to use a certain new and useful Improvement in Air-Valves for Steam Apparatus; and I do hereby declare the following to be a full, clear, and exact description of my said invention, reference being had to the annexed drawings, making part of this specification, wherein—

Figure 1 is a side elevation of my air-valve. Fig. 2 is a vertical section of the same. Fig. 3 is an inverted plan. Fig. 4 is a plan of the top of said air-valve. Fig. 5 is a partial plan of the top, and Fig. 6 is a similar plan of the bottom of the same. Fig. 7 is a section of my cylindrical valves. Fig. 8 is an inverted plan thereof. Fig. 9 is a plan of the top of said valve. Fig. 10 is a section of my valve-seat. Figs. 11 and 12 are a plan and inverted plan of said seat, and Fig. 13 shows the adjusting-nuts to the valve.

Similar marks of reference denote the same parts.

In various kinds of steam machinery—such as coils of pipe—employed for heating purposes the apparatus is at times allowed to cool down, either at night or by the shutting off the steam. In all such instances it is necessary to let in atmospheric air, in order to prevent the formation of a vacuum and injury to the joints of pipes or other parts of the apparatus, and when the pressure of steam again fills the apparatus the air must be allowed to escape, and then the orifice be closed to prevent the steam escaping into the building or apartment. To effect this object the heat has been made to act upon a pipe to expand the same and shut off the outlet for the air. This means, however, is not operative by pressure, but by heat, and hence a body of cold water formed by condensation reaching such valve would blow out through the same, often to the great annoyance and inconvenience of parties using the apparatus.

The nature of my said invention consists in a cylindrical valve between a seat and a pipe that enters within said cylinder-valve, said valve being so balanced that the escape of air will not make it move; but the impact of water striking within said cylinder or the pressure of steam forces said valve to its seat and keeps it there until the condensation of the steam by the apparatus cooling causes a sufficient vacuum to allow the atmospheric pressure to open the valve and admit air to the pipes.

In the drawings, $a$ is a socket or coupling by which my air-valve is to be connected to any steam-coil or other apparatus. $b$ is a small cup or chamber rising above this coupling and provided with the screw-cap $d$, that is perforated with holes 8 8.

$c$ is a pipe within the chamber $b$, rising above the coupling $a$.

$e$ is the valve-seat, introduced with the packing 3 beneath the screw-cap $d$. This seat $e$ has a guide-pipe, 5, for the stem 6 of the cylindrical valve $f$, that incloses the pipe $c$.

$i$ is a spring by which the weight of the valve $f$ and its parts is sustained, and 9 is a nut to adjust the point at which the valve remains when in a normal state, and $g$ is a screw cap or cover to the air-valve.

When the pressure of steam is not on the apparatus, the valve $f$ will rest upon or nearly close to the end of the pipe $c$, and the air has free access through the holes 8 and 4 into the cup $b$, and thence up through the cylindrical part of the valve $f$ and through the notches 2, provided for that purpose, into the pipe $c$ and coil or other steam apparatus. When the steam is let into the apparatus, or is gradually at or near atmospheric pressure in the reverse direction to that before named, and so soon as the pressure rises sufficiently above that of the atmosphere, the steam lifts the valve $f$ and sends the upper face thereof against a ground ring-seat, 7, on $e$, that prevents any further escape of fluid.

In cases when water forms in the coil from condensation, the impact of the same within the said valve $f$, as driven forward by an accumulation of pressure, will close the said valve and prevent any leakage, and the valve will remain closed until upon the cooling of the apparatus the pressure becomes less inside than the atmosphere, when the said valve $f$ will descend by its weight and the atmospheric pressure acting through the holes 4.

Any water accumulating in the steam-heating apparatus is generally drawn off at a proper place, or gradually runs back to the boiler, and to prevent water remaining in the cup $b$, should any pass thereinto, I provide a hole or holes, as at 1, connecting from the bottom to the socket a, whence said water will run away by the steam-pipe.

My apparatus is cheap, efficient, and durable, and the action thereof can be adjusted with ease by the nut 9, so as to make the valve f rise against the seat e when acted on by a greater or less force.

What I claim, and desire to secure by Letters Patent, is—

Cylinder-valve f, in combination with the pipe c and seat e, as and for the purposes specified.

In witness whereof I have hereunto set my signature this 21st day of June, 1862.

JAMES M. STIVEN.

Witnesses:
LEMUEL W. SERRELL,
THOS. GEO. HAROLD.